(12) United States Patent
Bensberg et al.

(10) Patent No.: US 10,866,971 B2
(45) Date of Patent: Dec. 15, 2020

(54) HASH COLLISION TABLES FOR RELATIONAL OPERATIONS

(71) Applicant: SAP SE, Walldorf (DE)

(72) Inventors: Christian Bensberg, Heidelberg (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 394 days.

(21) Appl. No.: 15/601,983

(22) Filed: May 22, 2017

(65) Prior Publication Data
US 2018/0336263 A1 Nov. 22, 2018

(51) Int. Cl.
| | | |
|---|---|---|
| G06F 16/28 | (2019.01) | |
| G06F 16/23 | (2019.01) | |
| G06F 16/2455 | (2019.01) | |
| G06F 16/901 | (2019.01) | |

(52) U.S. Cl.
CPC ........... *G06F 16/284* (2019.01); *G06F 16/23* (2019.01); *G06F 16/2455* (2019.01); *G06F 16/9014* (2019.01)

(58) Field of Classification Search
CPC ........... G06F 16/2255; G06F 16/24532; G06F 16/24544; G06F 9/30021; G06F 9/30032; G06F 9/30036; G06F 16/2456; G06F 16/245; G06F 16/24556; G06F 16/221; G06F 16/2237; G06F 11/1453; G06F 12/1018; G06F 16/152; G06F 16/174; G06F 16/23; G06F 16/244; G06F 16/2453; G06F 16/24537; G06F 16/24542; G06F 16/24562; G06F 16/24568; G06F 16/278; G06F 16/283; G06F 16/9014; G06F 16/9535; G06F 2201/83; G06F 7/24; G06F 7/36
See application file for complete search history.

(56) References Cited

U.S. PATENT DOCUMENTS

2015/0186464 A1* 7/2015 Seputis ............. G06F 16/24539
707/718
2016/0275078 A1* 9/2016 Attaluri ............... G06F 16/2255

* cited by examiner

*Primary Examiner* — Shyue Jiunn Hwa
(74) *Attorney, Agent, or Firm* — Mintz Levin Cohn Ferris Glovsky and Popeo, P.C.

(57) ABSTRACT

A system for hash collision tables for relational operations is provided. In some implementations, the system performs operations comprising generating a plurality of hash values for at least a portion of one or more database tables based on a database query, and generating a hash table for at least a portion of the plurality of hash values. The operations can further include generating first results based on execution of a first operation in the database query using the hash table. Additionally, the operations can further include generating second results based on the first results and execution of a second operation in the database query using the hash table. Related systems, methods, and articles of manufacture are also described.

17 Claims, 6 Drawing Sheets

200

210 — Load a first database table comprising at least one data entry

220 — Access at least one second database table comprising at least one data entry

230 — Obtain a hash value for each data entry in the first database table and the at least one second database table

240 — Store each obtained hash value into a corresponding hash table for each database table of the first database table and the at least one second database table

250 — Determine that a hash collision exists between at least two data entries of at least one of the first database table and the at least one second database table

260 — Store the hash value corresponding to the hash collision in a hash collision table

270 — Execute an operation on the first database table and the at least one second database table, referencing the hash table and the hash collision table to produce a result set

510 — Identify, based on a database query, one or more database tables for execution of the database query

520 — Generate a plurality of hash values for at least a portion of the one or more database tables

530 — Generate a hash table, a hash collision table, and/or a resolution dictionary for at least a portion of the plurality of hash values

540 — Update the hash table, the hash collision table, and/or the resolution dictionary based on new rows added to the one or more database tables

550 — Generate, based on execution of a first operation in the database query, first results based on the hash table, the hash collision table, and/or the resolution dictionary

560 — Generate, based on the first results and execution of a second operation in the database query, second results based on the hash table, the hash collision table, and/or the resolution dictionary

570 — Provide, based on the second results, data responsive to the database query

FIG. 5

HASH COLLISION TABLES FOR RELATIONAL OPERATIONS

CROSS REFERENCE TO RELATED APPLICATIONS

This application is related to U.S. application Ser. No. 15/350,852, filed on Nov. 14, 2016, and entitled "INCREMENTALLY BUILDING HASH COLLISION TABLES," and a continuation-in-part of U.S. application Ser. No. 15/350,798, filed on Nov. 14, 2016, and entitled "HASH COLLISION TABLES FOR RELATIONAL JOIN OPERATIONS," the disclosures of which are incorporated herein by reference.

TECHNICAL FIELD

The subject matter described herein relates to database operations, and more particularly, hash collision tables for relational database operations.

BACKGROUND

Hashing operations can be used to increase the efficiency of relational operations, such as those used in relational databases, by enabling various data entries to be represented by hash values. However, depending on how the hashing is performed, it is possible that different data entries will generate the same hash value, which is known as hash collisions. Thus, resolving hash collisions while leveraging hashing in database applications can require the use of complex data structures and/or costly hashing operations, which may require additional storage and/or processing overhead to maintain. This reduces benefits derived from hashing. Accordingly, it can be desirable to utilize hash collision procedures for relational operations that are more efficient and/or have lower overhead.

SUMMARY

In some aspects, a method, computer program product and system are provided. In an implementation, a system for generating and/or using hash collision tables for relational operations is provided. The system can include (or otherwise utilize) at least one processor and/or memory, which can be configured to perform operations including generating, based on a database query, a plurality of hash values for at least a portion of one or more database tables. The operations can also include generating, for at least a portion of the plurality of hash values, a hash table based on comparing, for each of the plurality of hash values, the hash value against a list of hash values in the hash table to determine whether a matching hash value exists. The hash table can also be generated based on adding, when the matching hash value does not exist, the hash value to the list of hash values, and/or comparing, when the matching hash value exists, first underlying data used to generate the hash value against second underlying data used to generate the matching hash value to determine whether the first and second underlying data are equivalent. Generating the hash table can include adding, when the first and second underlying data are equivalent, an entry for the hash value in one or more of a hash collision table or a resolution dictionary. The operations can further include generating, based on execution of a first operation in the database query, first results based on the hash table, the hash collision table, and/or the resolution dictionary. Additionally, the operations can include generating, based on the first results and execution of a second operation in the database query, second results.

In some variations, the plurality of hash values can be generated based on entries in a main part and a delta part for the main part, wherein the first operation and/or the second operation comprises an aggregation operation performed on the main part and the delta part. In some variations, the first operation comprises a first join operation of a first database table and a second database table, wherein the second operation comprises a second join operation of the first results and a third database table, wherein the hash table is generated based on the first database table, the second database table, and the third database table, and wherein the second results are generated based on the hash table, the hash collision table, and/or the resolution dictionary.

In some implementations, generating the plurality of hash values comprises identifying, based on the first operation, a plurality of columns in a first database table and/or generating, for each of a plurality of rows in the first database table, a combined hash value for the row based on data in the identified plurality of columns. In related implementations, generating the combined hash values can comprise generating, for each of the plurality of rows, a plurality of first hash values based on entries in each of the identified plurality of columns, and/or concatenating, for each of the plurality of rows, the plurality of first hash values to form the combined hash value. In other related implementations, generating the combined hash values can comprise concatenating, for each of the plurality of rows, a plurality of entries from each of the identified plurality of columns to form a combined entry, and/or generating, for each of the plurality of rows, the combined hash value based on executing a hashing function on the combined entry.

In some variations, the operations can further comprise identifying, based on the database query, the one or more database tables for execution of the database query as database tables identified in the database query. In some aspects, the plurality of hash values can be generated based on applying a hash function to data contained in a plurality of entries of the one or more database tables. In some variations, the operations can further comprise providing, based on the second results, data responsive to the database query. In some variations, the operations can further comprise updating, based on new rows added to the one or more database tables, the hash table, the hash collision table, and/or the resolution dictionary.

Implementations of the current subject matter can include systems and methods consistent with the present description, including one or more features as described, as well as articles that comprise a tangibly embodied machine-readable medium operable to cause one or more machines (e.g., computers) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, and/or the like.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 depicts a flowchart illustrating a process for building hash a collision table, in accordance with some example implementations;

FIG. 5 depicts a flowchart illustrating another process for using hash a collision table, in accordance with some example implementations.

When practical, similar reference numbers denote similar structures, features, or elements.

DETAILED DESCRIPTION

As noted above, it can be desirable to utilize hash collision tables for relational operations.

Figure 1:
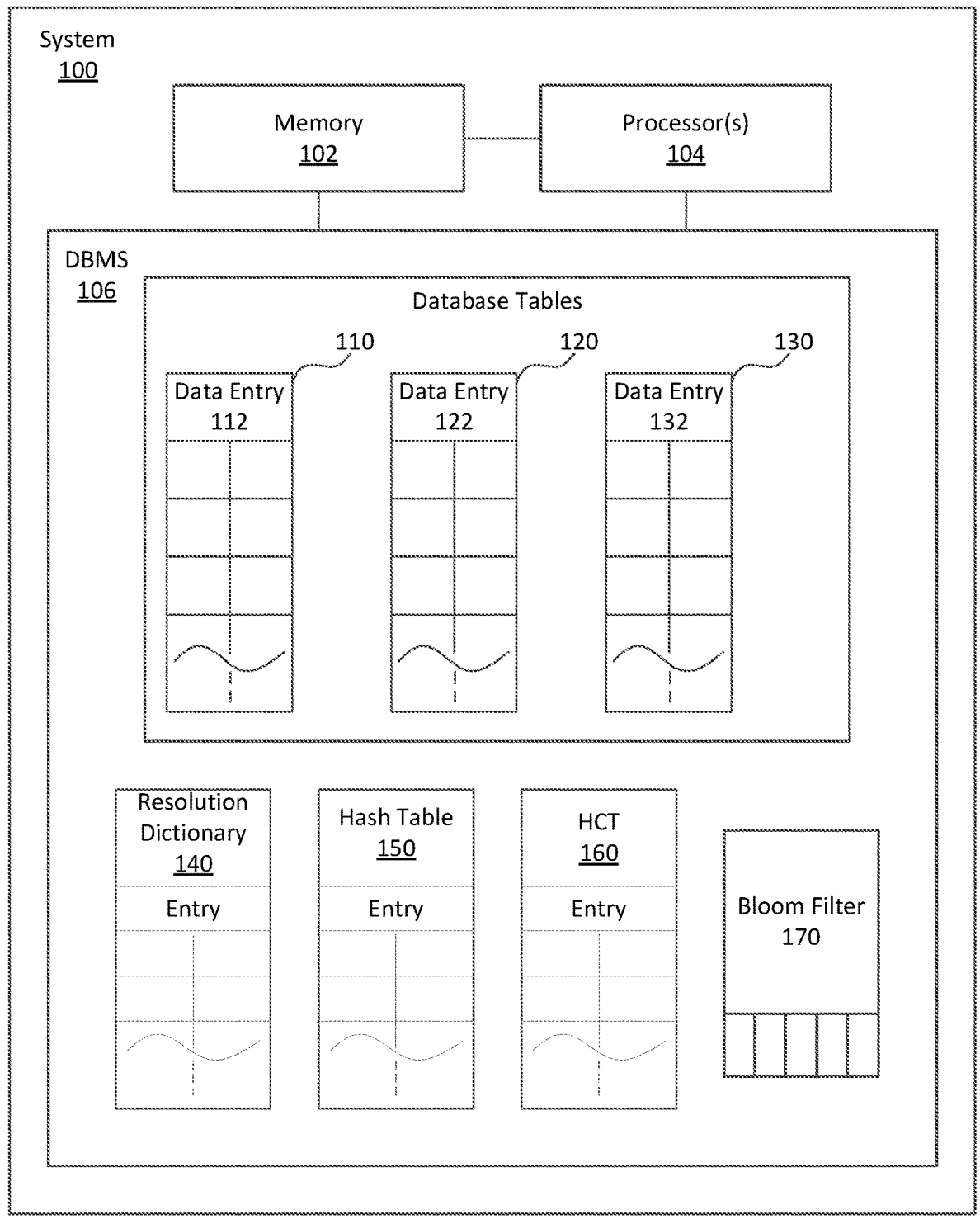
FIG. 1 depicts a block diagram of a system for hash collision tables for relational operations, in accordance with some example implementations.

FIG. 1 depicts a block diagram of a system 100 for hash collision tables for relational operations, in accordance with some example implementations. In some aspects, the system 100 can provide hash collision tables having incremental build functionality. System 100 may comprise hardware (e.g., circuitry, dedicated logic, programmable logic, microcode, and/or the like), software (e.g., instructions executing on a processing device), or a combination thereof. In some aspects, not all of the illustrated or described components may be required.

As illustrated, system 100 comprises at least one memory 102 and at least one processor 104 coupled to the memory 102. Memory 102 may represent a plurality of memory arrays, and/or processor 104 may include a plurality of processors, such as in a multiprocessing environment, which may span a plurality of computing systems.

System 100 may include a database management system 106 (DBMS). While running, DBMS 106 can reside in memory 102, but may additionally or alternatively reside in other storage media. DBMS 106 may include database tables 110, 120, and 130, and/or each of these database tables 110, 120, and 130 may contain varying numbers of corresponding data entries 112, 122, and 132, and so on. While only three database tables 110, 120, and 130 are shown, the system 100 and/or DBMS 106 may, in practice, include any number of database tables. Likewise, while only one data entry 112, 122, and 132 is shown in each database table 110, 120, and 130, respectively, any number of data entries may be present in a database table.

The system 100, DBMS 106, or both, may be equipped with circuitry, logic, or software, and/or the like, that may perform operations including but not limited to storing data in storage devices, loading stored data into memory from storage devices, and/or processing data. In various aspects, data can be processed in one or more ways, which can rely one any number of arithmetic, comparisons, vector operations, matrix operations, hash functions, sets of data, relational operations, aggregate operations, database views, and/or the like.

At least a portion of the illustrated system 100 may include hardware and/or software that interacts with a database, users, and/or other software applications for defining, creating, and/or updating data, for receiving, handling, optimizing, and/or executing database queries, and/or for running software/applications which utilize a database. In some aspects, the DBMS 106 can include a structured, organized collection of data, such as schemas, tables, queries, reports, views, and/or the like, which may be processed for information. In some implementations, the DBMS 106 can include definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario, business process, and/or the like. The DBMS 106 may be physically stored in a hardware server or across a plurality of hardware servers. In some aspects, the system 100 may be implemented as a cloud-based system.

In some aspects, core software can be stored within the memory 102 and/or configured to load the information from the DBMS 106 to the memory 102 (e.g., main memory) in response to receipt of a query instantiated by a user or computer system through one or more user access devices, external software, and/or the like. In some implementations, all, substantially all, or at least a large amount of the operational data of the DBMS 106 can reside in-memory (e.g., in random-access memory (RAM)). The DBMS 106 may include a column store database and/or the system 100 may be configured to perform OLTP (online transaction processing) and/or OLAP (online analytical processing), which can include complex analytics and tasks.

A database table 110, 120, and 130 may refer to and/or include any type of structured data set in a relational model. Such structured data sets may include column-oriented tables, row-oriented tables, associative arrays, key-value stores, similar groups of data arrangements or patterned storage, and/or the like.

In some implementations, a Bloom filter 170 may be used to determine probabilistically whether or not an element is present in a set of elements, which may utilize one or more different hash functions. Bloom filter 170 may reference other larger or more complex elements in a data set by way of a vector, array, bitmap, bit vector, a simplified data structure, and/or the like. When another component of system 100 references the Bloom filter 170, the Bloom filter 170 may indicate or identify the possibility that an element may be in a data set, and/or may indicate or identify, with a higher degree of certainty, that a given element is absent from the data set.

In some aspects, a Bloom filter 170 can take into account the number of corresponding data entries, such as the data entries in database tables 110, 120, and 130, and/or can take into account the number of hash functions used in the system 100 or the DBMS 106. A Bloom filter 170 may be regenerated entirely when data sets add and/or change entries. In some implementations, a Bloom filter 170 may be built incrementally, appending bits as needed, rather than rebuilding from scratch. This can result in reduced processing overhead. To accommodate data sets of varying sizes, the Bloom filter 170, in some implementations, may use variations of a relatively small number of hash functions as effectively as using a larger number of independent hash functions. In this way, the Bloom filter 170 may have many independent hash functions or many variations of a smaller number of hash functions, allowing Bloom filter 170 to change size incrementally without necessarily incurring a significant increase in design complexity and/or processing overhead.

In some implementations, the Bloom filter 170 may be a single functional structure used for all database tables. In other implementations, Bloom filter 170 may include a plurality of structures (e.g., Bloom filters) used with an associated database table 110, 120, 130 as it is accessed, which can reduce processing overhead.

In some implementations, a hash table 150 may be used for storing hash values of corresponding data entries 112, 122, and/or 132 in the database tables 110, 120, and/or 130, respectively. In other implementations, hash table 150 may include a separate structure (e.g., hash table) for each database table 110, 120, 130 accessed by the system 100 and/or DBMS 106. For example, each data entry 112, 122, 132 (or at least a portion thereof) in a corresponding database table 110, 120, 130 may be processed by a hash function to determine a hash value for the data entry 112, 122, 132. Once computed, each hash value corresponding to the data entries 112, 122, 132 may be stored in the hash table 150, as described in greater detail below. In some implementations, each database table may have a corresponding hash table 150. In other implementations, a singular hash table 150 may be used to handle multiple database tables 110, 120, 130.

Hash values are traditionally generated by the use of hashing/hash functions. A hash function may take a data entry (e.g., a value stored in a cell of a database table) as input and produce a hash value as output. For a given hash function, different data entries generally yield unique hash values. Because of this property, and due to the fact that hash values may be of a consistent, fixed length, it is often less costly (e.g., in terms of processing overhead) to compare hash values than to comparing large data entries. Thus, comparing hash values to determine whether large data entries are the same/different can be beneficial. However, in some aspects, not all hash values correspond to a singular data entry, which results in a hash collision, even though different data entries were used to generate the same hash value. In such cases, further processing is needed to resolve the hash collision.

In some implementations, a hash collision table 160 (illustrated as "HCT") may be used for tracking/storing information on identified hash collisions. In some implementations, a hash value is referred to as a hash collision value in a case where the hash value corresponds to a known hash collision within the system 100 and/or DBMS 106. In some implementations, hash collision values in the hash collision table 160 may be indexed and/or referenced for resolution with their corresponding original data values, which are distinct from each other.

Some implementations may employ a resolution dictionary 140. The resolution dictionary 140 may be a separate data structure that associates a unique identifier, such as a special index value, with each hash collision value in the hash collision table 160. The resolution dictionary 140 may associate the special index value and/or each hash collision value with corresponding data entries (e.g., original data entries/values) that each result in the same hash collision value of a detected hash collision. To ensure a unique identifier for each original data entry that results in a hash collision, in some implementations, the special index values may be used in place of and/or alongside the hash collision values. This can allow the system 100 and/or DBMS 106 to realize the benefits of hashes when performing relational operations with database tables 110, 120, 130 having large data entries.

Some implementations may additionally or alternatively use other methods of resolving hash collisions. Other such methods can involve multiple hashing, including double hashing, enhanced double hashing, triple hashing, and/or the like, any of which can include an individual hash function or multiple independent hash functions; separate chaining of various data structures; open addressing methods (e.g., coalesced hashing, cuckoo hashing, hopscotch hashing), which can include probe sequences such as linear probing or quadratic probing, and/or the like.

In various implementations, data entries are not fixed, and may be inserted or updated. Hence, hash collision tables 130 and/or other data structures have to be constantly updated. In so doing, it should not be necessary to load all data for comparisons. In implementations involving partitions with old data or historic data, it should be possible to build a hash collision table 160 incrementally for relevant partitions without loading vast amounts of data from historic partitions that do not contribute to the result set of the query at hand.

FIG. 2 depicts a flowchart illustrating a process 200 for building hash a collision table, in accordance with some example implementations. Although process 200 is described with reference to FIG. 1, other implementations are possible.

At operational block 210, the processor 104 of the system 100 of FIG. 1, for example, loads a first database table 110 into memory 102 (e.g., if the first database table 110 is not already loaded). The first database table includes at least one data entry 112. As part of operational block 210, other database tables that may be needed (e.g., such as for a relational operation) may be loaded concurrently with or subsequent to loading the first database table 110. For example, if a second database table 120 has not yet been loaded but will be needed for an operation, the second database table 120 may be also loaded into memory at operational block 210. The second database table 120 may include at least one data entry 122.

At operational block 220, the processor 104 may access the second database table 120. For example, if the system 100 and/or DBMS 106 perform a relational operation on memory-resident database tables, such as a join operation, then at least two database tables in memory 102 may be accessed for processing. In some implementations, this accessing can be to any number of other database tables, and/or the accessing may take place concurrently, sequentially, randomly, and/or in any other suitable pattern or order. In another implementation, only one database table may be involved, such as in a case of a self-join, for example. In some implementations, the second database table 120 may be a copy of at least a portion of the first database table 110.

At operational block 230, the processor 104 may obtain a hash value for each data entry in the first database table 110 (or at least a portion thereof) and/or the second database table 120 (or at least a portion thereof). In order to obtain a hash value for any data entry, the data entry can be processed with an associated hash function. In various implementations, the hashing function used may generate a 4-bit, an 8-bit, a 16-bit, a 32-bit, a 64-bit, or a 128-bit hash value. However, other lengths of hash values are possible. For example, in some implementations, a 63-bit hash value can be generated and a $64^{th}$ (or first) bit can be reserved/utilized for a flag/indicator (e.g., to indicate whether there is a hash collision, as described herein). In some implementations, unlike a Bloom filter 170, the hash table 150 may use the same hash function for entries in the same hash table. For most data entries, the hash function used should return a unique hash value for each data entry. However, in some cases, a hash collision may exist.

At operational block 240, the processor 104 may store each hash value (or at least a portion thereof) in a hash table 150. If the hash table 150 includes multiple hash tables, the hash table 150 may use the same hash function for entries in the same hash table.

At operational block 250, the processor 104 may determine whether a hash collision exists between at least two data entries of the first database table 110 and/or the second database table 120. In order to determine whether a hash collision exists among multiple hash values, the processor 104 may execute a comparison operation for each hash value against each other hash value available to the system 100 and/or DBMS 106, such the hash values presently stored in the hash table 150. When hash values are determined to be equal (matching), corresponding data entries for each matching hash value may then be compared to determine whether the corresponding data entries are also equal. In cases where the corresponding data entries are not equal, then processor 104 can determine that a hash collision exists. In cases where the corresponding data entries are equal, then processor 104 can determine that a hash collision does not exist between the instances of the same hash value. In some aspects, the common hash value can be used to identify the same data, existing in two or more different locations. Aside from the illustrated or described implementations, other methods of hash value comparison may be used for improved efficiency.

At operational block 260, for each case where a hash collision is determined to exist, the processor 104 can store the hash collision value (or some indication thereof) within the hash collision table 160. If the same hash collision value already exists in the table, then the same value may not need to be stored again in the hash collision table 160.

At operational block 270, the processor 104 may execute a database operation, such as a join operation or an aggregation operation, on the first database table 110 and/or the second database table 120, referencing the hash table 150 and/or the hash collision table 160 to produce a result set.

As noted above, the hash collision table 160 may contain a list of hash values known to have collisions (e.g., a hash function applied to one or more unique data entry generates the same hash value). In some implementations, hash collision table 160 may contain other information corresponding to the hash collision values, such as information associated with the unique data entries that yielded the same hash value. In other aspects, the hash collision table 160 may contain information similar to that contained in a resolution dictionary 140.

Following the execution of process 200, a hash table 150 may be fully populated with hash values from each data entry of each of at least two database tables 110, 120, and/or a hash collision table 160 may include any hash values that are determined to have collisions. Accordingly, a join operation may be performed irrespective of partitions in the first database table 110, the second database table 120, and/or other database tables that may be joined, further reducing a memory footprint of memory-resident databases and/or increasing the speed of execution of database operations.

Bloom filter 170 may be used independently, or in combination with hash table 150 and/or hash collision table 160, in some exemplary implementations. For example, at least one Bloom filter 170 corresponding to the hash table 150 may be used for checking hash values already in the hash table 150 against newly obtained hash values for collision. As above, a single Bloom filter 170 may correspond to the entries in all database tables 110, 120, and 130 (or a subset of the database tables 110, 120, and/or 130), or separate Bloom filters 140 may correspond to each database table 110, 120, and 130.

By using a Bloom filter 170, additional performance gains may be realized because some hash value comparisons may be skipped where they are determined to be unnecessary. For example, where a Bloom filter 170 corresponding to a hash table 150 indicates or identifies an absence of a matching data entry within a hash table, comparison of hash values 150 may be determined to be unnecessary. In other implementations, where a Bloom filter 170 corresponding to a database table 110, 120, and/or 130 indicates or identifies an absence of a matching data entry within the database table 110, 120, and/or 130, additional computation of hash values may be determined to be unnecessary. Consequently, hash value computations may be skipped for certain database tables, depending on system resources and/or configuration.

A join operation may be performed with SQL queries, plan operators, and/or other programs or routines employing techniques similar to those used in database management systems, such as the DBMS 106. The join operation executed may be any of an inner join, a full outer join, a left outer join, a right outer join, a semi-join, a cross join, a natural join, a self-join, an equi-join, a non-equi-join, a theta join, a hash join, and/or the like. In some aspects, a "hash join" can be different from the processes described herein relating to the generation of hash tables and hash collision tables.

The hash table 150 may be appended with hash values from each data entry newly accessed from any database table 110, 120, and/or 130, and/or the hash collision table 160 may be filled as necessary with any hash values that are newly determined to have collisions among any data entries loaded or accessed from any of the database tables 110, 120, and/or 130.

In some implementations, Bloom filter 170 may be fully updated upon loading or accessing any newly loaded or newly accessed database tables 110, 120, and/or 130 or partitions. In some implementations, Bloom filter 170 may be incrementally updated upon loading or accessing any newly loaded or newly accessed database tables 110, 120, and/or 130 or partitions, without fully regenerating Bloom filter 170. By incrementally updating the Bloom filter, additional processing overhead may be averted.

Additionally or alternatively, process 200 can include the processor 104 obtaining a hash value for any new data entries in the first database table 110, the at least one second database table 120, and at least one third database table 130. The third database table 130 may be a newly accessed or newly loaded table. Because the third database table 130 is new, additional hash values may be required for each data entry 132 to be accessed in the third database table 130. Any new data entries that may have been added to the first database table 110 or second database table 120 may similarly require hash values, which, in some implementations, can be retrieved from an existing hash table 150.

Additionally or alternatively, process 200 can include the processor 104 determining, for each obtained hash value corresponding to the third database table 130, whether a hash collision exists between at least two data entries of the first database table 110, the second database table 120, and/or the third database table 130. In some implementations, the process 200 can include the processor 104 appending, to the hash collision table 160, any hash collision value corresponding to a determined hash collision. Any other number of database tables 110, 120, 130 can be accessed, from which hash values may be determined and/or incrementally added to the hash table 150 and/or hash collision table 160.

Although resolution dictionaries 140, hash tables 150, hash collision tables 160, and/or Bloom filters 170 may be globally built and/or updated across all database tables 110, 120, 130 in a DBMS 160, such global rebuilding and updating can cause the system 100 to incur significant processing burdens and/or require significant storage space for operations. Thus, it can be advantageous to allow for incremental building resolution dictionaries 140, hash tables 150, hash collision tables 160, and/or Bloom filters 170, which can occur based on a query in question.

Figure 3:
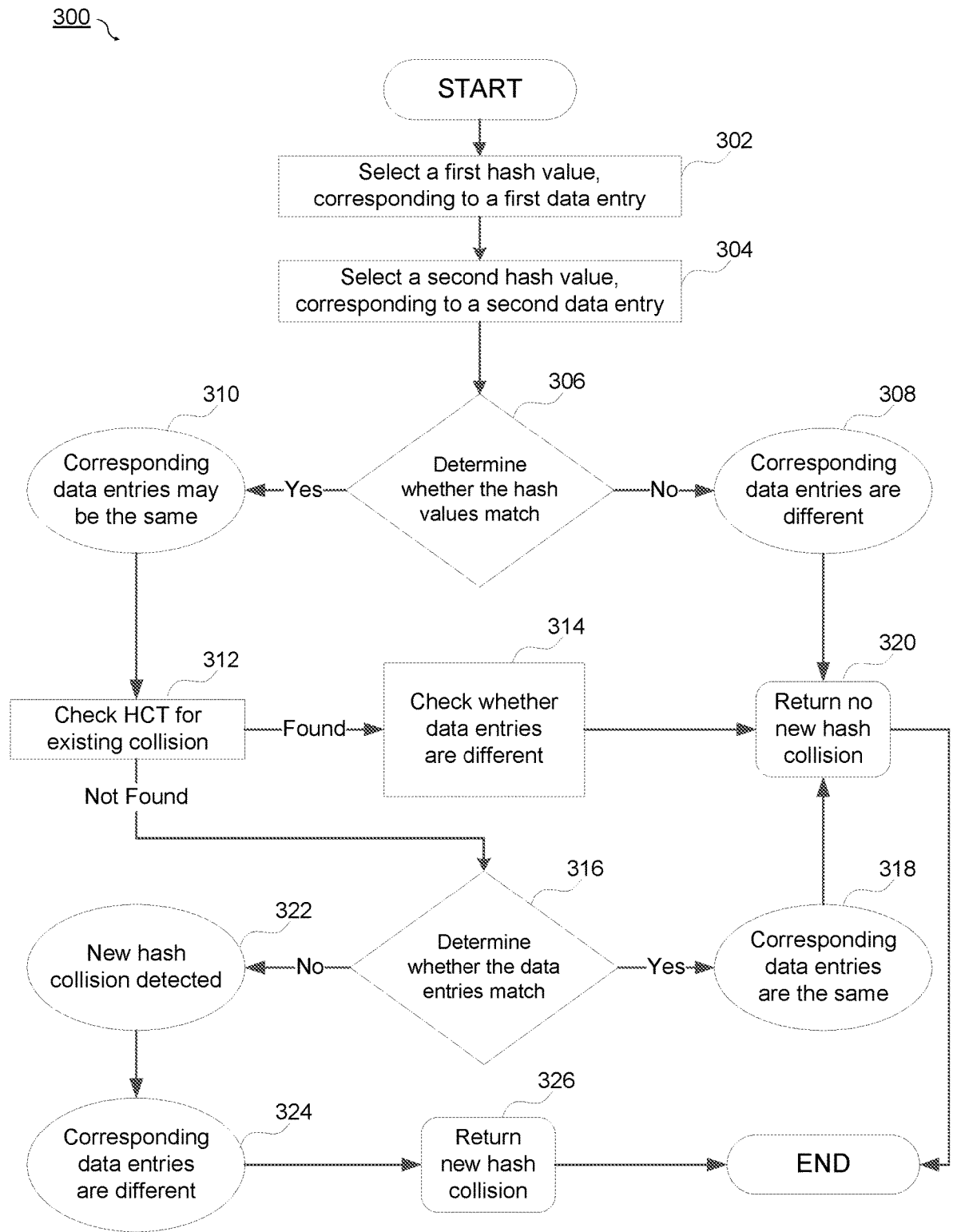
FIG. 3 depicts a flowchart illustrating another process for building hash a collision table, in accordance with some example implementations.

FIG. 3 depicts a flowchart illustrating another process 300 for building hash a collision table, in accordance with some example implementations. Although process 300 is described with reference to FIG. 1, other implementations are possible.

At operational block 302, the processor 104 selects a first hash value, corresponding to a first data entry. This hash value could be selected as retrieved from hash table 150, or it could additionally or alternatively be generated on the fly, such as concurrently with or immediately following selection of a data entry from a database table. The corresponding data entry here could refer to any data entry in any database table.

Similarly, at operational block 304, the processor 104 selects a second hash value, corresponding to a second data entry. Operations 302 and 304 may be executed concurrently or sequentially in any order. These two hash values are selected for comparison, for example, when a database operation is being performed across two database tables, where each of the first database entry and the second database entry are in different database tables of the two database tables across which a database operation is being performed.

At decision block 306, the processor 104 determines whether the first hash value matches the second hash value. In some aspects, the processor 104 executes a comparison operation to determine whether or not the two hash values here are equal. If the two hash values here are not equal, execution then proceeds to operational block 308. Otherwise, the first hash value is the same as the second hash value, and execution proceeds to operational block 310.

At operational block 308, it is determined that, because the hash values are unequal, the corresponding data entries must also be unequal. Processor 104 may set a flag, pass a token by reference or by value, or otherwise signal the system 100 and/or DBMS 106 that the data entries do not match. Such signaling could facilitate performance of a join operation, for example. Execution might also not return any hash collision to be stored in hash collision table 160, such as at operational block 320. In some implementations, a different value may be returned to a calling function, routine, or subroutine, to indicate that no hash collision is to be returned.

At operational block 310, following detection of matching hash values at decision block 306, it is then tested whether the matching hash values are indicative of matching data entries, or instead, if the matching hash values are the result of a hash collision between non-matching data entries. At this point, it is possible that the corresponding data entries are the same, but it is not yet possible to be sure if the hash function used could be expected to produce hash collisions. Execution advances to decision block 312.

At decision block 312, the processor 104 checks the hash collision table 160 to determine whether the hash values correspond to any hash collision already detected. In some aspects, if a hash collision had been detected, its hash collision value may have already been stored in the hash collision table 160, and a comparison of one of the first or second hash values here against all hash collision values in the hash collision table 160 would determine that a hash collision exists if the matching hashes presently being evaluated happen to coincide with an existing, already known hash collision. In this case, where a hash collision is found in the hash collision table 160 which corresponds to the currently selected hash values, then no new hash collision needs to be added to the hash collision table 160. Still, the corresponding data values may be checked, directly, via a resolution dictionary, and/or by other suitable hash collision resolution means, such as at operational block 314.

At operational block 314, the corresponding data values are checked for whether or not they are different from each other. Merely because a hash collision exists does not indicate with certainty that the corresponding data entries are different in this case. Whether the data entries are the same or different, the result of such a direct comparison would be relevant to a database operation, such as a relational join operation, for example. However, direct comparison of each corresponding data entry may not always be necessary in all implementations. In implementations where a resolution dictionary 140 is used, the resolution dictionary 140 may be referenced to determine whether such data values from the corresponding hash collision are already known and assigned a unique identifier, such as a special index. If so, then processor 104 can signal the system 100 and/or DBMS 106 by any appropriate means to indicate that the corresponding data entries are different. After resolution dictionary or similar structure is employed, if there is no indication that the data entries are different, then direct comparison of the data entries may be necessary. Although, as in 312 and 320, no new hash collision value may need to be added to the hash collision table, resolution dictionary or similar structures may need to be updated accordingly. If direct comparison reveals that the data entries are indeed different, then any new data entry corresponding to this hash collision may preferably be appended to the resolution dictionary with a new unique identifier. Such new data entry may be the first data entry, the second data entry, or both data entries. Otherwise, the data entries are equal. Processor 104 may also accordingly signal the system 100 and/or DBMS 106 by a return value or similar means, as needed.

If at decision block 312, a match with existing hash collision values in the hash collision table 160 is not found, then execution proceeds to decision block 316. At decision block 316, the processor 104 conducts a direct comparison of the data entries to determine whether the corresponding data entries match.

If the corresponding data entries are the same, then execution proceeds to operational block 318. At operational block 318, the processor 104 may signal such information to system 100 or DBMS, to the extent that such information may be needed for database operations, for example. Because there is a definite match between the data entries, then there is no hash collision, and processor 104 may also signal that information, such as by a return value or other suitable means, as at operational block 320.

Following any of operational blocks 308, 314, or 318, no new hash collision value needs to be added to the hash collision table 160, and execution can proceed to operational block 320. At operational block 320, the processor 104 need not perform any particular action. However, in some implementations, a special signal or value may be set or passed, indicating or identifying such information to any other system that would need to have such information. Following operational block 320, execution of process 300 may terminate.

If, at decision block 316, the data entries are determined to not match, this can signify a newly detected hash collision, as identified at operational block 322. The newly detected hash collision at operational block 322 may further indicate that the data entries are different at operational block 324. Processor 104 may signal either or both of these pieces of information to any other system that would need to have such information.

Following the newly detected hash collision, execution then advances to operational block 326. At operational block 326, the newly detected hash collision value is then returned, where it may be forwarded to the hash collision table to be stored for later reference. Execution of process 300 may then terminate.

Process 300 may be repeated for any comparison of hash values. For illustrative purposes, FIG. 3 shows only one illustrative implementation for incrementally building hash tables but this disclosure is not limited to that example implementation. Other implementations may further include a Bloom filter 170 and/or a resolution dictionary 140, each further saving steps in determining whether data values are present and matching. Such information is generally useful in performing many types of database operations.

Process 300 may be used to achieve improvement of system performance in systems or database management systems where data entries are sufficiently large that direct comparison of every entry would consume excessive system resources or be otherwise prohibitive. Furthermore, the incremental building of hash tables, hash collision tables, and Bloom filter(s) may additionally streamline this process 300 to provide a more scalable solution over prior art systems.

Figure 4:
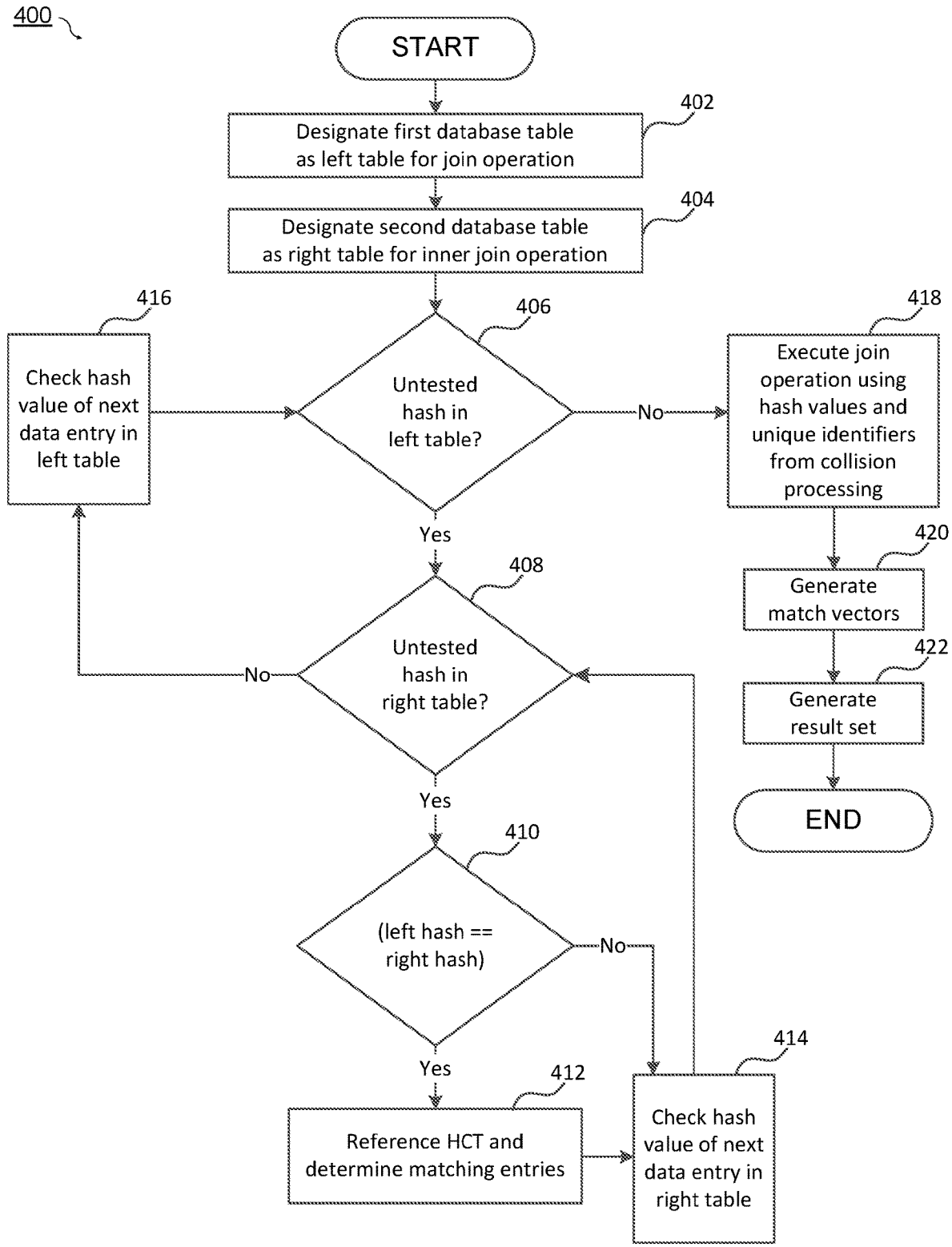
FIG. 4 depicts a flowchart illustrating a process for using hash a collision table, in accordance with some example implementations.

FIG. 4 depicts a flowchart illustrating a process 400 for using hash a collision table, in accordance with some example implementations. Process 400 of FIG. 4 illustrates how a hash collision table and accompanying hash collision resolution may be performed in the context of executing a join operation. Although process 400 is described with reference to FIG. 1, other implementations are possible.

At operational block 402, the processor 104 may designate a first database table as a left table in a multi-table join operation. This designation could be by a predetermined program, function, SQL query, or other suitable means.

At operational block 404, likewise, the processor 104 may designate a second database table as a right table in the multi-table join operation. The tables need not be the same size (e.g., having the same number of entries), depending on the type of join operation. Where a join operation is performed on more than two database tables, the process of designating left tables and right tables may, in some implementations, be repeated sequentially across the object set of database tables, such that the result set of one pair of database tables becomes the right table opposite the next database table designated as a left table.

At decision block 406, a hash value of a first data entry of the left table may be selected for comparison by processor 104. Initially, decision block 406 may run at least once, because left table should have at least one data entry. Upon subsequent iterations, if another hash value remains untested against the hash value(s) corresponding to the data entry of the right table, a hash value of the next data entry in the left table may be selected for comparison. Upon selection of the corresponding hash value of the appropriate data entry of the left table, execution advances to decision block 408.

At decision block 408, a hash value of a first data entry of the right table may be selected for comparison by processor 104 against the hash value of the first data entry of the left table, selected by processor 104 at decision block 406. Initially, decision block 408 will run at least once, because left table should have at least one data entry. Upon subsequent iterations, if another hash value remains untested against the hash value(s) corresponding to the data entry of the left table, a hash value of the next data entry in the right table will be selected for comparison. Upon selection of the corresponding hash value of the appropriate data entry of the right table, execution advances to decision block 410.

At decision block 410, the hash value selected from the appropriate data entry of the left table may be compared against the hash value selected from the appropriate data entry of the right table. If the compared hash values are not equal, then execution proceeds directly to operational block 414, where the right table is checked for another data entry to select its hash value for a subsequent comparison against the same hash value from the left table. Instead, if the values selected previously in decision blocks 406 and 408 do match, then execution advances to operational block 412.

At operational block 412, the processor 104 references hash collision table 160 to determine whether matching hashes correspond to a known hash collision. Data entries corresponding to the previously selected hash values are then compared to determine whether the corresponding data entries match, or instead whether they are distinct data entries that yield a hash collision. In some implementations, hash collision table 160 may have already been populated or updated in accordance with processes such as those described herein, eliminating the need for further processing during this operation. In some implementations, this processing may follow operations similar to those discussed with respect to process 300 of FIG. 3, including updating hash collision table 160 and resolution dictionary 140. Following operational block 412, execution can advance to operational block 414.

At operational block 414, the right table may be checked for another data entry to select its hash value for a subsequent comparison against the same hash value from the left table. Here, operational block 414 may do nothing but pass execution back to decision block 408. In some implementations, operational block 414 may increment a counter for traversing the right table's data entries. Once there are no more data entries in the right table whose hash values have not been tested against the hash value selected in decision 406, execution then advances to operational block 416.

At operational block 416, the left table may be checked for another data entry to select its hash value for a subsequent comparison against hash value(s) from the right table. Here, operational block 416 may do nothing but pass execution back to decision 406. In some implementations, operational block 416 may increment a counter for traversing the right table's data entries. Once there are no more data entries in the left table whose hash values have not been tested against the hash value(s) of the right table, execution then advances to operational block 418.

Referring back to decision block 406, if another hash value does not remain untested against the hash value(s) corresponding to the data entry of the right table, then operational block 418 is performed. At operational block 418, the processor 104 may execute the join operation as configured in the system 100 and/or DBMS 106. Instead of directly comparing data entries of each table, where each data entry may be large and cumbersome for comparison, each data entry's hash value may be used, except where there is a collision, in which case one of the resolution techniques described herein may further supplement the use of hash values, such as by including unique identifiers retrieved from a resolution dictionary, for example.

At operational block 420, the processor 104 may generate match vectors containing the actual data entries corresponding to the hash values compared in the join operation, further referencing the hash table and/or hash collision table as necessary to resolve hash collisions, which may also be done by probing. Thus, the match vectors form intermediate values by which a final result set may be generated. By way of example, in the case of an inner join, the intermediate result is where match vectors contain original data entries of the left table and matching data entries of the right table, as determined by matching hash values and unique identifiers, in some implementations. Operational block 420 may not be needed in some implementations. Execution may advance to operational block 422.

At operational block 422, the processor generates a result set. The result set may be a view, a materialized view, a separate database table, or any other suitable output. The result set may be generated from match vectors. Finally, for this particular join operation, execution terminates.

In some implementations, in cases where no hash collision is detected, the join operation may bypass referencing the hash collision table 160, but still may reference the hash table 150 for improved speed in determining matches across different data entries in different database tables.

In some implementation, to perform a join (e.g., an inner join operation), a first database table 110 may be loaded into memory 102, for example. Subsequently or concurrently, at least one second database table 120 may be accessed and/or loaded into memory 102, for example. A corresponding hash value for each data entry 112 (or at least a portion thereof) of the first database table 110 may be obtained by searching and/or returning corresponding values from a hash table 150 corresponding to the first database table 110 and the second database table 120. If hash values for any entries 112 are not already stored in the hash table 150, then they may be calculated. In executing the join operation, hash values of the first database table 110 may be searched against the hash table 150 to return the corresponding original data entry 112 values. In some aspects, the hash values may additionally or alternatively be stored in a corresponding hash table 150 for each database table 110, 120, which can simplify the join operation. Hash values corresponding to the data entries 122 for the second database table 120 may be retrieved in the same manner as with the data entries 112 for the first database table 110. Execution of the join operation may involve probing the at least one second database table 120 for data entries that match data entries of the first database table 110, and/or disregarding any data entry in the at least one second database table 120 which may have a corresponding hash value that fails to match any hash value of any data entry in the first database table. Using hash values for the join, as opposed to the original data entry 112, 122 values can save processing time and/or resources, especially when the original data entry 112, 122 contain strings.

In some implementations, the hashed values for each of the database tables 110, 120 involved in the join operation can be evaluate for collisions, and/or a hash collision table 160 can be utilized to track any detected collisions. After a hash collision table 160 has been filled with hash values corresponding to hash collisions detected, execution of the join may continue. For each hash value in the second database table 120 that matches a hash value in the first database table 110, the matching hash value may be checked against the hash collision table 160 to determine whether the matching hash corresponds to a detected hash collision. In some implementations, if the hash collision table 160 is empty, this operation may be skipped, which can avoid processing overhead. In certain implementations, when none of the matching hash values correspond to detected hash collision entries stored in the hash collision table 160, then the join operation may proceed to generate match vectors without the use of the hash collision table 160. In such implementations, the join operation can use the hash values and corresponding data entries, of data entries that match across the first database table 110 and the second database table 120, to be merged in the join operation.

In cases where at least one matching hash value is determined to appear (e.g., as a hash value of a detected hash collision) when referencing the hash collision table 160, the join operation can include an extra action for hash collision resolution. This hash collision resolution may involve directly retrieving the corresponding data entry 112 of the matching hash value from the first database 120 and the corresponding data entry 122 of the same matching hash value from the second database 120. Additionally or alternatively, the join operation may reference the resolution dictionary 140 to retrieve a unique identifier or the corresponding data entries, for any matching hash value that corresponds to a detected hash collision stored in the hash collision table 160.

Upon completion of the hash collision resolution action, the original data entry 112, 122 values corresponding to the hash collision may have been retrieved alongside the matching hash values in each database table 110, 120. At this point, the retrieved original data entry 112, 122 values may be compared. In a case where these values also match, as part of the join operation, these values may be added to the match vectors. Where these values fail to match, then the corresponding value(s) of the second database table 120 may be disregarded in performing the join (e.g., where the join is an inner join from the first database table 110 on the second database table 120). After match vectors have been generated, they may be used to create a materialized view. Additionally or alternatively, other types of result sets may be generated.

In some aspects, multiple columns of a database table 110, 120, and/or 130 may be joined as part of a join operation. For example, two or more columns of the database table 110 may be joined with at least one column of the database table 120. In some aspects, it may be beneficial to generate, based on multiple columns, one or more of a hash table 150, a resolution dictionary 140, a hash collision table 160, and/or a bloom filter 170, especially where the multiple columns are expected to be used (e.g., joined) multiple times.

For example, similar to the method 200 of FIG. 2, at least two database tables 110, 120, for example, may be identified, accessed, loaded, and/or the like. Thereafter, a hash value can be generated for each row, in each of the at least two database tables 110, 120. In some implementations, this hash value for each row in the first database table 110, for example, can be based on a combination of two or more columns of the database table 110. For example, individual entries from two different columns, for each row in the database table 110, can be combined (e.g., concatenated) and then a hash of the combination can be taken to generate a hash value. In some implementations, a hash value can additionally or alternatively be generated for each row by first individually hashing two or more entries in a given row to generate individual hash values, and then combining (e.g., concatenating) the individual hash values to generate a hash value for the row.

Each of these methods can be beneficial in different scenarios. For example, in the event that the various individual entries (e.g., row entries) in a column differ from each other (e.g., for the most part), then less hash matches and/or hash collisions among the generated hash values may result if the entries for the column are first combined with entries from at least one other column (in the same table) and then hashed. In the event that multiple operations are stacked within a query (e.g., as described below), then hashing the individual entries first and combining individual hashed entries thereafter can provide for faster query execution times.

Regardless of the method utilized to generate hash values for each row based on multiple columns, the generated hash values can be used as hash values for the generation of a hash table 150, a resolution dictionary 140, a hash collision table 160, and/or a bloom filter 170, as described herein. Similar methods can be utilized to generate hash values for the other database table 120 subject to the join. However, it is not required that the hash values generated for each database table 110, 120 be generated based on multiple columns to be considered a multi-column join (as long as hash values for at least one of the database tables 110, 120 are generated based on multiple columns).

In some implementations, the columns utilized for the generation of the hash values can be the same as the columns identified via the join operation. However, more or less columns from the database tables 110, 120, 130 can be utilized (e.g., all columns). In some aspects, a "checked" value/indication may be utilized per row, instead of per entry. For example, in single-column joins, when attempting to determine whether a given entry in a column of a database table 110, 120, 130 has already been checked against a hash table 150, for example, all entries which are identical (e.g., contain the same value before hashing) can be checked against a checked value/indication which is on a per entry basis. That is, a singular checked value/indication may be utilized to indicate multiple rows have been checked. However, in the case of multi-column joins, the combination of values must be identical across multiple rows for such a checked value/indication to be utilized. Accordingly, a checked value/indication can be used for each row instead.

In some implementations, a decision to utilize a multi-column hash can be an optimization decision made at design time and/or runtime. For example, a runtime optimizer can decide whether a multi-column hash would be beneficial, based on a query and/or underlying data, and/or make a selection of columns which are to be utilized for the multi-column hash.

In some aspects, a database table 110, 120, 130 may include a main part and a delta part. In some aspects, a main part can include multiple data entries and a delta part can include information which supplements the main part. For example, in some implementation, it may be beneficial if the rows of a database table are left undisturbed and/or any changes to rows are not made in place, but instead, in a separate delta part table. However, database operations on a table may need to consider the main and the delta part for many different kinds of processing. For example, as data is being stored in the respective parts independently, the main and delta also use their own data structures and/or internal keys to identify rows. An aggregation operation on the table must be processed on the main part and the delta part. An aggregation operation can involve a union of results (e.g., which satisfy a query predicate) from the main part with results from the delta part, and potentially some identity resolution after the union (e.g., to match up the identities of the rows in the delta part with the identities of the correct rows in the main part).

In some aspects, a main part and a delta part can be stored within the same database table 110, for example. However, in some implementations, this database table 110 can span more than one partition/fragment (e.g., be in different locations). Similarly, in some aspects, a main part can be stored in one database table 110, while a delta part is stored within the different database table 120.

When a main part and a delta part are stored within the same database table 110, then identity resolution may be simpler, as the same value identifiers may be utilized. However, when a main part and a delta part are stored within different partitions, fragments, database tables 110, 120, 130, etc., then identity resolution may be more complicated, as the different value identifiers may be utilized or even required. For example, in some aspects, dictionaries can be created for each partition, fragment, database table 110, 120, 130, and/or the like, which may end up individually assigning different identifiers for the same data. In accordance with this example, the value "Steve" can be assigned the identifier "42" in a dictionary for one database table 110 including the main part, but the same value "Steve" may be assigned the identifier "9000" in a dictionary for another database table 120 including the delta part. Resolving this issue can be regarded as identity resolution.

Aggregation operations can similarly benefit from the use of a hash table 150, a resolution dictionary 140, a hash collision table 160, and/or a bloom filter 170. For example, a hash table 150, a resolution dictionary 140, and/or a hash collision table 160 can be created for the combination of a main part and a corresponding delta part, based on a hash of the underlying data. Such an approach can help to avoid the necessity of identity resolution discussed above. Instead, in some aspects, the resulting hash values in the hash table 150, in combination with the resolution dictionary 140, and/or hash collision table 160 can be regarded as global identifiers for many different types of database operations. Once the hash table 150, resolution dictionary 140, and/or hash collision table 160 are created for the combination of the main part and the delta part, an aggregation operation may be performed on the main part and the delta part by leveraging the hash table 150, resolution dictionary 140, and/or hash collision table 160, as described herein.

In some aspects, multi-column hashing can be utilized for the execution of an aggregation operation. For example, if an aggregation operation is performed based on more than one column (e.g., as identified in a database query), then a hash table 150, a resolution dictionary 140, a hash collision table 160, and/or a bloom filter 170 can be generated using hash values of multiple columns in a main part and/or hash values of multiple columns in a delta part.

In some aspects, multiple database operations (e.g., stacked operations) may be performed sequentially and/or concurrently on data from database tables 110, 120, and/or 130, which can involve the generation of intermediate results. For example, a join operation of three database tables 110, 120, 130 can be regarded as a second join of database table 110 with the intermediate results of a first join of database tables 120 and 130 (A*(B*C)). In this example, a singular set of a hash table 150, resolution dictionary 140, hash collision table 160, and/or bloom filter 170, can be generated for the combination of all entries (or a least a portion) in database table 110, database table 120, and database table 130. Once a hash table 150 is generated for the combination of all of the database tables 110, 120, 130, it can be utilized for the execution of a join operation performed on the database tables 110, 120, 130 (e.g., join(A, B, C)). Although "stacked" joins are described, other combinations of operations may benefit from the uses of the hash table 150, resolution dictionary 140, hash collision table 160, and/or bloom filter 170 described, such as an aggregation operation which operates on intermediate results generated by a join operation.

In some aspects, individual entries may be hashed, in each of the database tables 110, 120, 130 subject to the stacked operations, for the purposes of generating the hash table 150, resolution dictionary 140, hash collision table 160, and/or bloom filter 170. In the event multiple columns are utilized (e.g., subject to a join operation) per row, in at least one of the database tables 110, 120, 130 subject to the stacked operations, then multi-column joining procedures can be leveraged in the generation of the hash table 150, resolution dictionary 140, hash collision table 160, and/or bloom filter 170. In some implementations, when generating the hash table 150, resolution dictionary 140, hash collision table 160, and/or bloom filter 170 for stacked operations which utilize multiple columns, individual hash values can be first generated for each entry (e.g., each entry subject to the operation(s)) and then combined (concatenated) before they are compared against the hash table 150, for example.

In some aspects, one or more of the database tables 110, 120, 130 can be identified as being "subject to" the stacked operations based on the database tables 110, 120, 130 (or some portion thereof) being identified in a database query. In some aspects, when the database query includes stacked operations on one or more identified database tables 110, 120, 130, then a hash table 150, resolution dictionary 140, hash collision table 160, and/or bloom filter 170 can be generated for the combination of all of the one or more identified database tables 110, 120, 130. However, in some implementations, only a portion of the one or more identified database tables 110, 120, 130 may be used in the generation of the hash table 150, resolution dictionary 140, hash collision table 160, and/or bloom filter 170, such as the database tables/portions which are subject to a join and/or an aggregation operation.

In some implementations, when stacked operations are present, a hash table 150, resolution dictionary 140, hash collision table 160, and/or bloom filter 170 may be first generated for the combination of two database tables 110, 120, for example. Thereafter, once the intermediate results are generated for the join of these two database tables 110, 120 (e.g., based on the hash table 150 for their combination), a separate hash table 150, resolution dictionary 140, hash collision table 160, and/or bloom filter 170 may be first generated for the combination of the intermediate results and a third database table 130 can be generated. Based on the separate hash table 150, resolution dictionary 140, hash collision table 160, and/or bloom filter 170, a join operation (or other operation) on the intermediate results and the third database table 130 may be performed.

Although entire database tables 110, 120, 130, entire columns from the database tables 110, 120, 130, and/or entire rows from database tables 110, 120, 130 are often described, in various aspects, smaller portions thereof may be utilized. For example, although a join operation may identify one or more columns of a database table 110, 120, 130 for joining, the join operation may also be based on one or more predicates which require that one or more rows of the database table 110, 120, 130 be ignored. Further, although separate database tables 110, 120, 130 are identified as being subject to join and/or aggregation operations, an individual database table 110 (or some portion thereof) can be subject to join operations, aggregation operations, and/or the like.

FIG. 5 depicts a flowchart illustrating another process 500 for using hash a collision table, in accordance with some example implementations.

Method 500 can start at operational block 510 where the processor 104, for example, can identify, based on a database query, one or more database tables 110, 120, 130 for execution of the database query. In some aspects, the one or more database tables can be identified as tables specified in the database query. However, in some aspects, additional actions may be required for identifying/locating all portions of the one or more tables. For example, if a first table identified in the database query is stored across multiple database partitions, then each partition (or a portion thereof) may need to be located in memory. Although a database partition is described, other portions of a database can be utilized.

In some implementations, the processor 104 may receive the database query and/or a request to execute the database query. In some implementations, a database query may be executed multiple times (e.g., the processor 104 is frequently requested to execute the query). In such implementations, rather than calculating hash values and/or identifying hash collisions each time execution of the query is requested, it can be beneficial to store hashed values of at least a portion of the tables required for execution of the query. Accordingly, a hash table 150, a hash collision table 160, and/or a resolution dictionary 130 can be generated and/or stored based on a request to execute a database query, a request to store a database query, an optimizer determination (e.g., a determination that a database query is/will be executed frequently or a threshold number of times), and/or the like.

If a database query requests information from, or otherwise utilizes, multiple different database tables and/or multiple columns of one or more database tables, then a hash table 150 which leverages a combination of the multiple database tables and/or multiple columns can be implemented. For example, in some implementations, a single hash table 150 can be generated to include hash values from both a first database table 110 and a second database table 120. In other implementations, multiple hash tables 150 can exist separately for each individual database table 110, 120, 130. The selection/generation of more or less hash tables 150 can be an optimizer decision.

Although example implementations are described with respect to column-store databases and/or hashing based on one or more columns of data, other implementations may leverage row-store databases and/or hashing based on one or more rows of data.

Method 500 can proceed to operational block 520 where the processor 104, for example, can generate a plurality of hash values for at least a portion of the one or more database tables. In some implementations, the plurality of hash values can be generated based on applying a hash function to data contained in a plurality of entries of the one or more database tables.

In some aspects, the selection of the values for hashing can be based on operations in the database query and/or database tables identified by the database query. In some implementations, generating the plurality of hash values can comprise identifying a plurality of columns in a first database table based on the first operation, and/or generating a combined hash value for a row based on data in the identified plurality of columns for each of a plurality of rows in the first database table.

In some aspects, generating the combined hash values can comprise generating a plurality of first hash values based on entries in each of the identified plurality of columns for each of the plurality of rows, and/or concatenating the plurality of first hash values to form the combined hash value for each of the plurality of rows. In other aspects, generating the combined hash values comprises concatenating a plurality of entries from each of the identified plurality of columns to form a combined entry for each of the plurality of rows, and/or generating the combined hash value based on executing a hashing function on the combined entry for each of the plurality of rows. Although the term "value" is used, the information used for generating a hash, as well as the hash itself, are not required to be numbers, and can include a string, alphanumeric characters, and/or other data.

Method 500 can proceed to operational block 530 where the processor 104, for example, can generate a hash table, a hash collision table, and/or a resolution dictionary for at least a portion of the plurality of hash values. In some aspects, the generation of the hash table, the hash collision table, and/or the resolution dictionary can be based on operations in the database query and/or database tables identified by the database query.

In various implementations, the generation of the hash table, the hash collision table, and/or the resolution dictionary can be based on (a) comparing, for each of the plurality of hash values, the hash value against a list of hash values in the hash table to determine whether a matching hash value exists, (b) adding, when the matching hash value does not exist, the hash value to the list of hash values, (c) comparing, when the matching hash value exists, first underlying data used to generate the hash value against second underlying data used to generate the matching hash value to determine whether the first and second underlying data are equivalent, and/or (d) adding, when the first and second underlying data are equivalent, an entry for the hash value in one or more of a hash collision table or a resolution dictionary.

Method 500 can proceed to operational block 540 where the processor 104, for example, can update the hash table, the hash collision table, and/or the resolution dictionary based on new rows added to the one or more database tables. For example, at least a portion of one or more of the steps used to create the hash table, the hash collision table, and/or the resolution dictionary can be implemented to update these data structures (e.g., comparing for matches among hash values and/or underlying data).

Method 500 can proceed to operational block 550 where the processor 104, for example, can generate, based on execution of a first operation in the database query, first results based on the hash table, the hash collision table, and/or the resolution dictionary. In some aspects, the generation of the first results can utilize the hash table, the hash collision table, and/or the resolution dictionary as a global dictionary for underlying values in at least a portion of the one or more database tables. In some aspects, the hash table, the hash collision table, and/or the resolution dictionary can provide a global dictionary for all tables involved in the database query.

Method 500 can proceed to operational block 560 where the processor 104, for example, can generate, based on the first results and execution of a second operation in the database query, second results based on the hash table, the hash collision table, and/or the resolution dictionary. The generation of the second results can be similar to the generation of the first results, but may instead be based on intermediate results, rather than a previously defined data structure. In some aspects, the plurality of hash values can be generated based on entries in a main part and a delta part for the main part, wherein the first operation and/or the second operation comprises an aggregation operation performed on the main part and the delta part.

In some implementations, the first operation can comprise a first join operation of a first database table and a second database table, and the second operation can comprise a second join operation of the first results and a third database table. In related aspects, the hash table for such operations can be generated based on the first database table, the second database table, and the third database table. Additionally or alternatively, the second results can be generated based on the hash table, the hash collision table, and/or the resolution dictionary.

Method 500 can proceed to operational block 570 where the processor 104, for example, can provide, based on the second results, data responsive to the database query. Although results based on two operations are described, results based on more or less operations may be possible. In various aspects, results of operations which do not include the final results responsive to the query can be regarded as intermediate results.

Performance of the method 500 or at least a portion thereof can allow for shorter query execution times and/or greater database system efficiency. In some aspects, shorter query execution times can be more common when the underlying data includes strings, especially as the length of such strings increase.

As a result of the referencing of the hash table 150, a system performing a join or other database operation can avoid processing overhead and memory consumption when performing an operation on database tables having large data entries. Even in cases where hash collisions occur, referencing hash collision table 160 and/or resolution dictionary 140 in these cases may still reduce processing overhead and memory consumption over other methods that do not use hashing, hash tables, and/or hash collision tables in this manner.

By performing database operations referencing hash tables 150 and/or hash collision tables 160 in this manner, performance gains may be realized over other methods for certain use cases (e.g., those using translation tables and/or global dictionaries). Actual performance can depend on other factors, such as available memory, sharing, the nature of the data entries in the system 100 or DBMS 106, and/or the like.

While implementations have been described herein in the context of first and second database tables 110, 120, in other embodiments, the functions described herein can be applied to any number of database tables, including at least a portion of one database table or more than two database tables.

Figure 6:
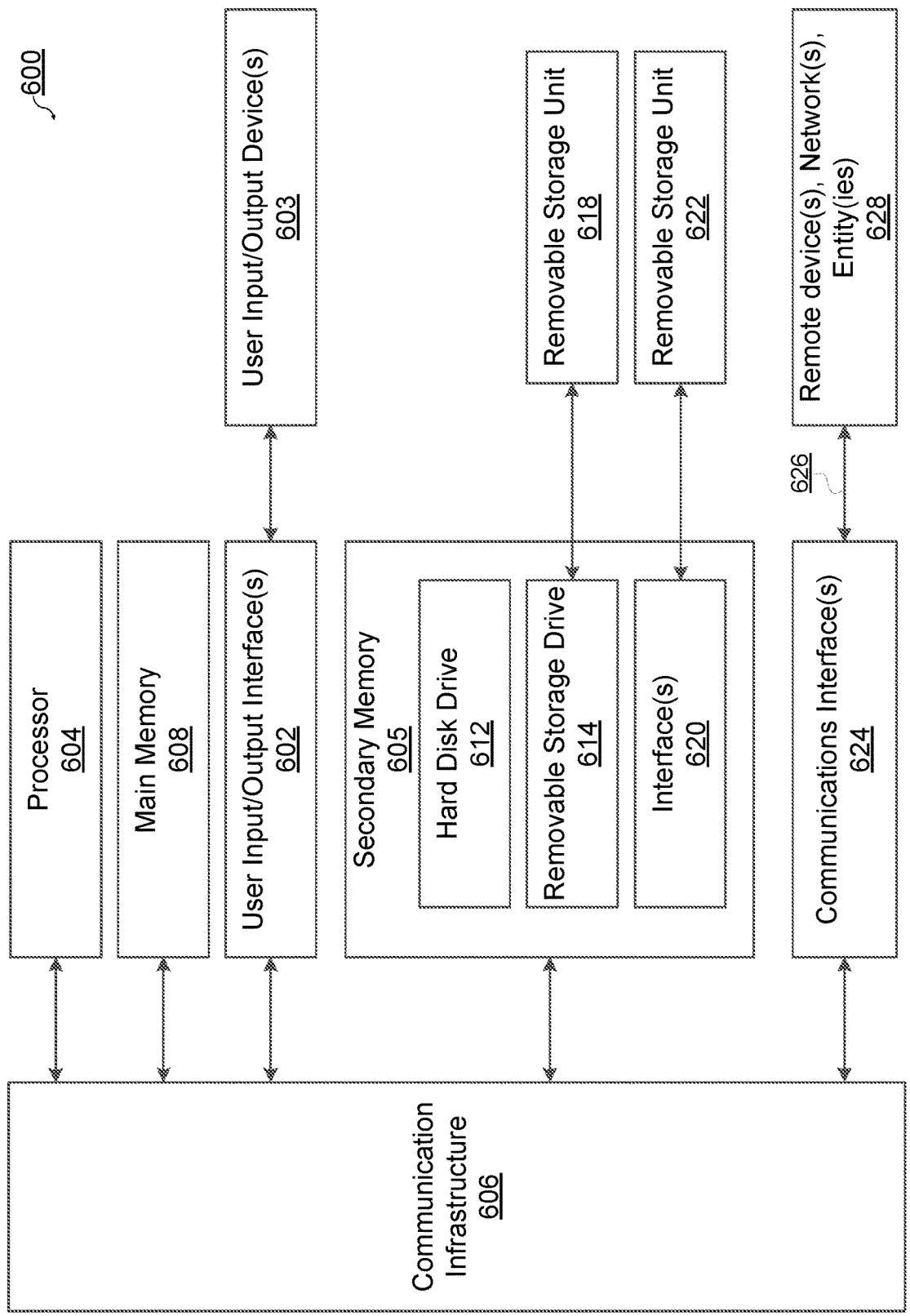
FIG. 6 depicts a block diagram of an example computing system, in accordance with some example implementations.

FIG. 6 illustrates a functional block diagram of a computer system 600 in which features consistent with the described subject matter may be implemented. Computer system 600 can be any computer capable of performing the functions described herein. In some aspects, one or more of the components for the computer system 600 can include and/or otherwise be used to implement at least a portion of the system 100 of FIG. 1. In various implementations, the various methods 200, 300, 400, and/or 500 (or at least a portion thereof) may be performed by one or more of the system 100, the memory 102, the processor 104, the DBMS 106, one or more of the entities/components of the computer system 600, other related apparatuses, and/or some portion thereof. In some implementations, at least a portion of the various methods 200, 300, 400, and/or 500 can form at least a portion of another method 200, 300, 400, and/or 500. For example, method 400 and/or 500 may build on method 200. In some aspects, the computer system 600 (or at least a portion thereof) may be regarded as a server.

As illustrated, the computer system 600 includes one or more processors (also called central processing units, or CPUs), such as a processor 604. Processor 604 is connected to a communication infrastructure or bus 606.

One or more processors 604 may each be a graphics processing unit (GPU). In an implementation, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, and/or the like.

Computer system 600 also includes user input/output device(s) 605, such as monitors, keyboards, pointing devices, and/or the like, that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in any one of a number of manners.

According to an exemplary implementation, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, and/or the like (individually and collectively referenced by reference number 628). For example, communication interface 624 may allow computer system 600 to communicate with remote devices 628 over communications path 626, which may be wired and/or wireless, and which may include any combination of LANs, WANs, the Internet, and/or the like. Control logic and/or data may be transmitted to and from computer system 600 via communication path 626.

Communication over the communications path 626 can utilize a network access device, such as a base station, a Node B, an evolved Node B (eNB), an access nodes (ANs), a hotspot, and/or the like. Wired or wireless communication among the components/entities of the computer system 600 can occur according to various protocols and/or access technologies (e.g., Global System for Mobile Communication (GSM), Universal Mobile Telecommunications System (UMTS), technologies developed by IEEE such as WiFi and/or Bluetooth, technologies developed by the Third Generation Partnership Project (3GPP) or 3GPP2 such as Long Term Evolution (LTE) and/or CDMA2000, etc.).

In an implementation, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

In some aspects, at least some of the components/entities of the computer system 600 can include personal computers, desktop computers, laptops, workstations, cell phones, digital media devices, smart phones, smart watches, PDAs (personal digital assistants), tablets, hardware/software servers, sensors, sensor devices, terminals, access terminals (ATs), mobile stations, user equipment (UE), subscriber units, and/or the like.

Some implementations may operate with software, hardware, and/or operating system implementations other than those described herein. One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can additionally or alternatively store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic input, speech input, tactile input, and/or the like. Other possible input devices include touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such phrases are intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." The use of the term "based on," above and in the claims is intended to mean "based at least in part on," such that a feature or element that is not recited is also permissible.

References herein to "one implementation," "an implementation," "an example implementation," "some implementations," "other implementations," or similar phrases, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it would be within the knowledge of persons skilled in the relevant art(s) to incorporate such feature, structure, or characteristic into other implementations whether or not explicitly mentioned or described herein.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods. In addition, the logic flows depicted in the accompanying figures and/or described herein do not necessarily require the particular order shown, or sequential order, to achieve desirable results. Similarly, one or more of the operations described can occur in parallel with at least one other operation, such as in multi-processor and/or multi-core processing systems. Other implementations may be within the scope of the following claims.

What is claimed is:

1. A system comprising:
   at least one processor; and
   at least one memory storing instructions which, when executed by the at least one processor, cause operations comprising:
      generating, based on at least a database query, a plurality of hash values for at least a portion of one or more database tables by at least identifying at least two columns in a first database table, and generating, for at least one row of a plurality of rows in the at least two columns, a hash value by at least applying a hashing function to data in the at least one row of the at least two columns;

generating, for at least a portion of the plurality of hash values, a hash table by at least:

comparing, for each of the plurality of hash values, the hash value against a list of hash values in the hash table to determine whether a matching hash value exists, adding, when the matching hash value does not exist, the hash value to the list of hash values, comparing, when the matching hash value exists, first underlying data used to generate the hash value against second underlying data used to generate the matching hash value to determine whether the first and second underlying data are equivalent, and adding, when the first and second underlying data are equivalent, an entry for the hash value in one or more of a hash collision table or a resolution dictionary;

generating, based on at least the execution of a first database operation in the database query and based on at least the hash table, the hash collision table, and/or the resolution dictionary, first results; and generating, based on at least the first results and execution of a second database operation in the database query, second results.

2. The system of claim 1, wherein the plurality of hash values are generated based on entries in a main part and a delta part for the main part, and wherein the first database operation and/or the second database operation comprises an aggregation operation performed on the main part and the delta part.

3. The system of claim 1, wherein the first database operation comprises a first join operation of the first database table and a second database table, wherein the second database operation comprises a second join operation of the first results and a third database table, wherein the hash table is generated based on the first database table, the second database table, and the third database table, and wherein the second results are generated based on the hash table, the hash collision table, and/or the resolution dictionary.

4. The system of claim 1, wherein the generating the plurality of hash values further comprises:

generating, for each of the plurality of rows, a plurality of first hash values based on data entries in each of the identified at least two columns; and concatenating, for each of the plurality of rows, the plurality of first hash values to form the hash value.

5. The system of claim 1, wherein the generating the plurality of hash values further comprises:

concatenating, for each of the plurality of rows, a plurality of data entries from each of the identified at least two columns to form a combined entry; and generating, for each of the plurality of rows, the hash value based on executing the hashing function on the combined entry.

6. The system of claim 1, wherein the operations further comprise:

identifying, based on the database query, the one or more database tables for execution of the database query as database tables identified in the database query.

7. The system of claim 1, wherein the plurality of hash values are generated based on applying the hash function to data contained in a plurality of data entries of the one or more database tables.

8. The system of claim 1, wherein the operations further comprise:

updating, based on new rows added to the one or more database tables, the hash table, the hash collision table, and/or the resolution dictionary.

9. The system of claim 1, wherein the operations further comprise:

providing, based on the second results, data responsive to the database query.

10. A method comprising:

generating, based on at least a database query, a plurality of hash values for at least a portion of one or more database tables by at least identifying at least two columns in a first database table, and generating, for at least one row of a plurality of rows in the at least two columns, a hash value by at least applying a hashing function to data in the at least one row of the at least two columns;

generating, for at least a portion of the plurality of hash values, a hash table by at least:

comparing, for each of the plurality of hash values, the hash value against a list of hash values in the hash table to determine whether a matching hash value exists, adding, when the matching hash value does not exist, the hash value to the list of hash values, comparing, when the matching hash value exists, first underlying data used to generate the hash value against second underlying data used to generate the matching hash value to determine whether the first and second underlying data are equivalent, and adding, when the first and second underlying data are equivalent, an entry for the hash value in one or more of a hash collision table or a resolution dictionary;

generating, based on at least the execution of a first database operation in the database query and based on at least the hash table, the hash collision table, and/or the resolution dictionary, first results; and generating, based on at least the first results and execution of a second database operation in the database query, second results.

11. The method of claim 10, wherein the plurality of hash values are generated based on entries in a main part and a delta part for the main part, and wherein the first database operation and/or the second database operation comprises an aggregation operation performed on the main part and the delta part.

12. The method of claim 10, wherein the first database operation comprises a first join operation of the first database table and a second database table, wherein the second database operation comprises a second join operation of the first results and a third database table, wherein the hash table is generated based on the first database table, the second database table, and the third database table, and wherein the second results are generated based on the hash table, the hash collision table, and/or the resolution dictionary.

13. The method of claim 10, further comprising:

updating, based on new rows added to the one or more database tables, the hash table, the hash collision table, and/or the resolution dictionary.

14. A non-transitory computer-readable medium comprising instructions which, when executed by at least one processor, result in operations comprising:
- generating, based on at least a database query, a plurality of hash values for at least a portion of one or more database tables by at least
  - identifying at least two columns in a first database table, and
  - generating, for at least one row of a plurality of rows in the at least two columns, a hash value by at least applying a hashing function to data in the at least one row of the at least two columns;
- generating, for at least a portion of the plurality of hash values, a hash table by at least:
  - comparing, for each of the plurality of hash values, the hash value against a list of hash values in the hash table to determine whether a matching hash value exists,
  - adding, when the matching hash value does not exist, the hash value to the list of hash values,
  - comparing, when the matching hash value exists, first underlying data used to generate the hash value against second underlying data used to generate the matching hash value to determine whether the first and second underlying data are equivalent, and
  - adding, when the first and second underlying data are equivalent, an entry for the hash value in one or more of a hash collision table or a resolution dictionary;
- generating, based on at least the execution of a first database operation in the database query and based on at least the hash table, the hash collision table, and/or the resolution dictionary, first results; and
- generating, based on at least the first results and execution of a second database operation in the database query, second results.

15. The non-transitory computer-readable medium of claim 14, wherein the plurality of hash values are generated based on entries in a main part and a delta part for the main part, and wherein the first database operation and/or the second database operation comprises an aggregation operation performed on the main part and the delta part.

16. The non-transitory computer-readable medium of claim 14, wherein the first database operation comprises a first join operation of the first database table and a second database table, wherein the second database operation comprises a second join operation of the first results and a third database table, wherein the hash table is generated based on the first database table, the second database table, and the third database table, and wherein the second results are generated based on the hash table, the hash collision table, and/or the resolution dictionary.

17. The non-transitory computer-readable medium of claim 14, wherein the operations further comprise:
- updating, based on new rows added to the one or more database tables, the hash table, the hash collision table, and/or the resolution dictionary.

* * * * *